Oct. 14, 1969  J. W. TURNER  3,472,533
COUPLING SEAL FOR LINED TUBULAR ARRANGEMENT
Filed July 3, 1968
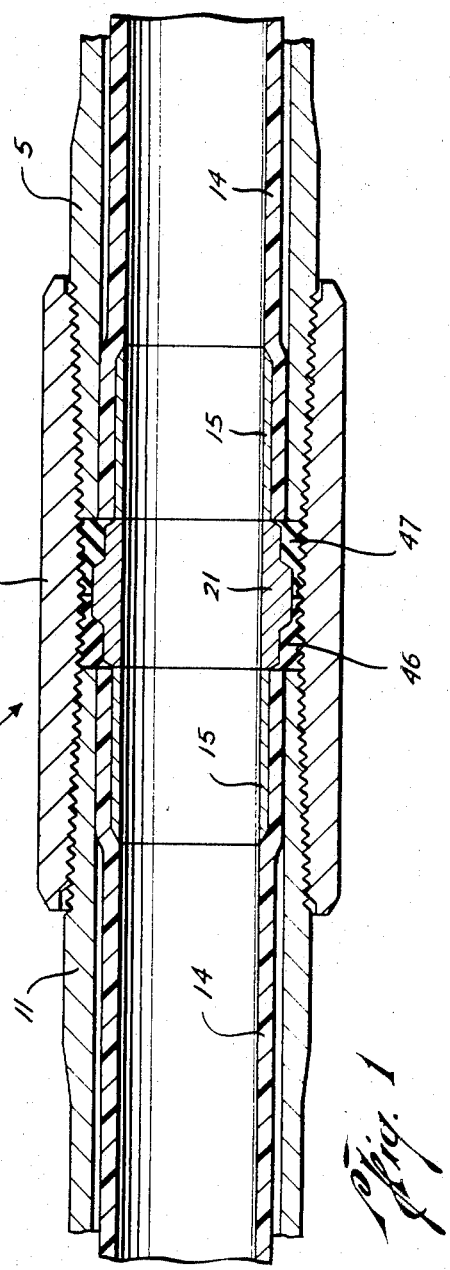
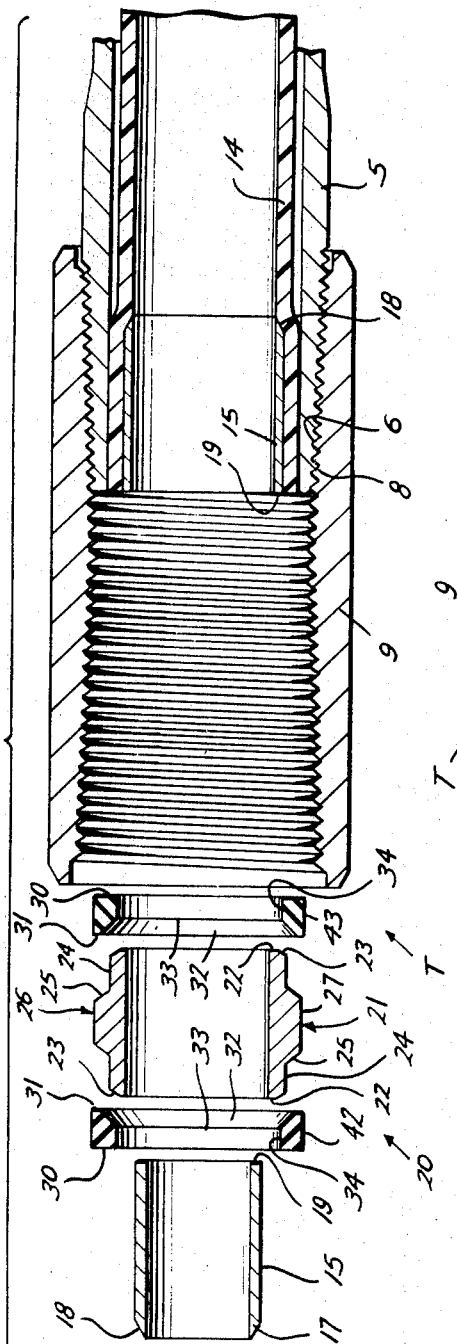
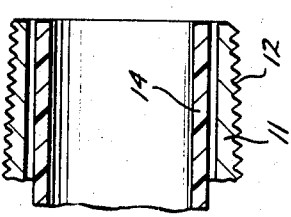
John W. Turner
INVENTOR
BY
Hayden Pravel Wilson & Matthews
ATTORNEYS

United States Patent Office 3,472,533
Patented Oct. 14, 1969

3,472,533
COUPLING SEAL FOR LINED TUBULAR ARRANGEMENT
John W. Turner, 2129 McCarty, Houston, Tex. 77029
Filed July 3, 1968, Ser. No. 742,383
Int. Cl. F16l 21/04
U.S. Cl. 285—55      2 Claims

ABSTRACT OF THE DISCLOSURE

A seal arrangement for length of metal pipe which have plastic conduits therein and which length of pipe are to be connected together at their ends by a coupling. The seal arrangement includes a metal ring of a particular configuration and two elastomeric rings, one at each end thereof for abutting the adjacent ends of the plastic lined, metal pipe, the metal ring and elastomeric rings being of a particular configuration and arrangement so that as the ends of adjacent lengths of pipe are connected in the couplings, the elastomeric rings are forced over shaped surfaces on the metal ring to fill all voids in the coupling between the lengths of metal pipe which are connected together by the coupling.

CROSS-REFERENCE TO RELATED APPLICATION

The present invention relates to an improvement in my prior co-pending application filed Jan. 30, 1967 bearing Ser. No. 612,493, now abandoned "Lined Tubular Arrangement for Conducting Fluid."

BACKGROUND OF THE INVENTION

Field of the invention

The present invention relates to a sealing arrangement for pipe lengths which are joined together by couplings and particularly to metallic pipe which is lined with plastic conduits.

Description of the prior art

As known to applicant the prior art is represented by the patent issued to J. M. Taylor, et al. on Jan. 17, 1967, No. 3,298,716.

Several problems arise in connection with the prior art in that a special sleeve arrangement must be provided for holding the plastic tubular member within the metal tubular member and additionally a seal arrangement is provided which is not entirely satisfactory for several reasons.

First of all, the seal arrangements of the prior art do not completely fill the void between the ends of pipe lengths which are connected together by a coupling and, secondly, such seal arrangements do not generally conform to the internal diameter of the bore through the tubular plastic member thereby creating tubulence or eddy currents within the fluid flow.

SUMMARY OF THE INVENTION

One advantage of the present invention for use in connection with standard pipe which is connected together by a coupling, is that it provides an arrangement wherein any gaps, or voids, are completely filled thereby inhibiting leakage from the joint and preventing any void spaces in the coupling between the joined ends of pipe length.

Also, the present invention is advantageous over the prior art in that a simple sleeve, preferably of stainless steel, is employed to retain the plastic tubular member within the metallic tubular member and is positioned therein merely by inserting it within the end of the plastic, and expanded by any suitable mechanical means so that the plastic is held at the end of each length of pipe between the stainless steel sleeve and the metal tubular member in which it is positioned.

Of particular significance is the seal arrangement in that it incorporates a metal ring having a plurality of surfaces of a particular configuration which cooperate with two elastomeric rings so that when the two lengths of pipe are joined in the coupling, the elastomeric rings are forced over the formed surfaces on the metal ring and closely conform thereto and thereby assure that all voids are filled within the coupling between the pipe ends.

BRIEF DESCRIPTION OF THE DRAWINGS

FIG. 1 is a sectional view showing the end portion of two lengths of metal pipe, each of which is provided with a tubular plastic liner and showing the final position of the seal arrangement and its relationship to the ends of plastic lined, metal pipe and the coupling which connect to the lengths of pipe together; and FIG. 2 is a sectional view somewhat similar to FIG. 1 but showing only one of the lengths of metal pipe positioned within the coupling and illustrating at one side in an exploded view the relationship of the metal ring and two elastomeric rings as well as the relationship of the metal sleeve prior to inserting it into the end of the tubular plastic lined, tubular metal member and expanding it to seat it therein and retain the tube of plastic within the metal pipe.

DESCRIPTION OF THE PREFERRED EMBODIMENT

Attention is first directed to FIG. 2 of the drawing which is a combination exploded view and sectional view as previously mentioned wherein the sealed tubular arrangement is referred to generally by the numeral T. On the right hand end of FIG. 2, it will be noted that a metal tubular member in section is shown at 5 as having external threads 6 on its end thereof for engaging with the internal threads 8 which extend longitudinally within the coupling 9 in which the pipe lengths 5 and 11 are to be joined together. The metal pipe length 11 is provided with external threads 12 adjacent its end for also engaging with the threads 8 of the coupling 9 as will be described and as more clearly illustrated in FIG. 1 of the drawings. It will be noted that the coupling 9 is bored and threaded in a manner so that its internal diameter is larger adjacent its ends and gradually decreases towards the central portion thereof.

Prior to the time that the tubular metal lengths 5 and 11 are joined together in the coupling 9, they are provided with a plastic tubular member of corresponding length represented by the numeral 14 which is slightly smaller in its outer diameter than the inner diameter of the pipe sections 5 and 6 within which they extend from end to end. Similarly, prior to threadedly engaging the plastic lined metal pipe lengths 5 and 11 within the coupling 9, a hollow annular sleeve as represented at 15 is inserted within the end of each of the pipe lengths 5 and 11 at each end thereof. One end 17 of each of the sleeves 15 is provided with a taper represented by the numeral 18 which extends circumferentially around the one end 17 of each sleeve 15 and aids in initially positioning the sleeve 15 within the plastic tubular member 14.

Thereafter the sleeve 15 may be expanded mechanically or by any other suitable means so that it moves radially and presses the plastic tubular member 14 the length of the sleeve 15 to sealingly engage against the inner wall of the metal tubular members 5 and 11 as more clearly seen in the right hand side of FIG. 2 and in FIG. 1 of the drawings. The taper 18 at the one end of each of the sleeves 15 not only aids in initially positioning such sleeve within the plastic tubular member 14, but also generally conforms to the internal diameter of the plastic tubular member 14 thereby tending to reduce any flow resistance or creating any eddy currents that might otherwise occur.

After the annular sleeves 15 have been positioned in each of the tubular members 5 and 11, the seal means designated generally by the numeral 20 for sealing between the ends of the lined pipe within the coupling 9 when they are joined therein is positioned as illustrated in FIG. 2 of the drawings ready for insertion into the coupling 9 after one of the metal pipe lengths such as 11, is threadedly engaged into the coupling 9. The seal means 20 includes an annular metal hollow ring 21 and two elastomeric hollow rings 42 and 43 formed of rubber or other suitable resilient material.

More specifically the annular metal ring 21 is provided at each end with an outer circumferential edge 22 that is substantially and preferably perpendicular to the longitudinal axis of the ring 21 for abutting the ends 19 of the sleeves 15 when the seal means and tubular members are in final position within the coupling 9 and for also engaging the end of the plastic lining 14 and the ends of the pipe lengths 5 and 11 as will be described in greater detail hereinafter.

The tubular plastic is coterminous with the end of the metal pipe lengths 5 and 11. At each end of the metal ring 21 is a circumferential edge 23 which slopes outwardly from the outer vertical edge 22, the edges 23 sloping towards each other as shown in FIG. 2 of the drawings. At their inner end as they join with the vetrical edges 22 and at their outer edges, they join with a pair of annular surfaces 24 which extend longitudinally of the ring 21 as shown in FIG. 2. Preferably, the longitudinal extent of each of the annular surfaces 24 of the ring 21 is substantially the same and terminates at its juncture with the outwardly and upwardly extending sloping end surfaces 25 of the shoulder 26 which shoulder is intergrally formed on the ring 21 and which shoulder projects radially beyond the annular surfaces 24 as shown in FIG. 2 of the drawing. The taper of the surfaces 23 and 25 is preferably substantially the same. It will be noted that the shoulder 26 is provided with an outer annular surface 27 which is parallel with the annular surfaces 24 and the shoulder 26 is preferably mid-way of the longitudinal extent of the sleeve 21 and the annular surface 27 may be slightly longer in longitudinal extent than either of the surfaces 24. However, in some circumstances it may be desirable to have the annular surface 27 of the same extent of the surfaces 24 or slightly smaller.

The outer diameter of the annular surface 27 is smaller than the smallest internal diameter of the coupling 9 within which it is to be seated.

The elastomeric rings 42 and 43 are each provided at one end 30 which is substantially and preferably perpendicular to the longitudinal axis of the coupling and to the elastomeric members 42 and 43.

The other end of each elastomeric member is provided with an outer edge portion 31 that is also substantially and preferably perpendicular to the longitudinal axis of the coupling and respective elastomeric member 42, 43 respectively. Extending inwardly from the outer perpendicular circumferential edge portion 31 of each elastomeric ring 42, 43 is the inwardly sloping surface 32 which terminates at its inner end 33 to define the internal diameter of the base 34 in each of the elastomeric rings 42 and 43. The shape of surface 32 is preferably at a greater angle than the slope on surfaces 23 and 25 to aid in flowing the rings over the surfaces, as will be described.

The diameter of the bore 43 of each of the elastomeric bodies 42, 43 is such that when the ring 21 abuts each of the elastomeric bodies 42 and 43, the inner wall of the bore will abut the outwardly sloping surfaces 23 at each end of the ring 21 to aid in deforming each elastomeric ring 42 and 43 as the coupling and pipe lengths are joined together.

Generally speaking the sloping surfaces 23 and the sloping surfaces 25 are substantially parallel while the surface 32 slopes at a greater angle as previously noted. As the member 11 is moved to final position within the coupling 9 as shown in FIG. 1 of the drawings, the elastomeric bodies 42 and 43 are deformed, by reason of their configuration as described so that they will first of all move upwardly and outwardly over each of the sloping surfaces 23, then along the annular surfaces 24 and then upwardly and over the sloping surfaces 25 and then outwardly over the annular surface 27 to surround it and thereby completely enclose and fill any gaps or voids within the coupling 9 between the lengths of pipe 5 and 11 when they are urged to final position as shown in FIG. 1 of the drawings. By reason of the vertical edges 30 on each of the elastomeric rings cooperating with the edges 22 on the ring 21 and the ends of the pipe and end 19 each of the rings 15, the elastomeric rings 42 and 43 are deformed so that they assume the position as illustrated at 46 and 47 in FIG. 1 to completely fill the voids. Prior to this time, each of the rings 15 has been inserted within its respective pipe end and radially expanded and thereafter the lengths of pipe 5 and 11 are threadedly connected within the coupling 9 until their end portions abut the ends 22 of the ring 21.

Preferably, the internal bore of the ring 21 is such that when the sealed tubular arrangement again referred to in FIG. 1 by the letter T is completed, the internal diameter throughout the coupling is generally substantially the same to inhibit any resistance to flow of fluid through the lined tubular conduits and to aid in eliminating any eddy currents in the flow.

Thus, the present invention not only provides an arrangement which completely seals off any voids within the coupling between the pipe ends of the tubular members 5 and 11, but it provides an arrangement which aids in streamline flow through the connection.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:
1. A sealed tubular arrangement for conducting fluids comprising:
 (a) an outer metallic length of pipe;
 (b) an inner tubular plastic length of pipe fitting within said outer length of pipe for conducting fluids therethrough;
 (c) means for securing said inner tubular plastic pipe at each of its ends to said surrounding metallic pipe, said means including an annular sleeve of stainless steel fitting in each of the ends of said plastic pipe, said sleeves maintaining each end of said plastic pipe in sealing engagement with said metallic pipe;
 (d) said sleeves each having one end that is tapered on its outer circumference to aid in positioning each of said sleeves within said plastic pipe and which also aids in providing a uniform, uninterrupted surface with the plastic pipe when it is expanded into sealing position against the outer metallic pipe;
 (e) said sleeves each having their other end substantially perpendicular to the longtiudinal axis of said sleeve;
 (f) a coupling connecting adjacent lengths of lined pipe together;
 (g) said coupling having internal threads formed therein;
 (h) said metallic pipe lengths each having threaded external ends engaging with said internal threads of said coupling;
 (i) means sealing between the ends of the lined pipe and providing a bore which is of substantially the same size as the bore in each of said sleeves when said pipe lengths are connected into said coupling;
 (j) said means including:
  (1) an annular metal ring which has at each end a circumferential edge that is substantially perpendicular to the longitudinal axis of said ring abutting said other end of each of said sleeves when said pipe lengths are connected into said coupling; said metal ring having at each end circumferential edges which slope outwardly and toward each other and at their inner end join with said perpendicular edge;

(2) a pair of annular surfaces formed on said ring and extending longitudinally thereof, said annular surfaces joining at one of their respective ends with one of said sloping circumferential edges;

(3) an annular shoulder integrally formed on said ring and extending longitudinally thereof, said shoulder having an annular outer surface thereon and two sloping end surfaces which slope outwardly and towards each other and in a plane generally parallel to said sloping circumferential edges; said sloping surfaces of said shoulder terminating at one end where they each join one of said pair of annular surfaces;

(4) a pair of elastomeric, annular rings, each of said rings having an outer circumferential edge portion that is substantially perpendicular to the longitudinal axis of said rings and a sloping circumferential edge portion that connects at one end with said outer circumferential edge portion and extends inwardly to the internal bore of each ring; and (5) the diameter of the internal bore of each ring being such that when said elastomeric rings are positioned one adjacent each end of said metal ring, the internal bore of said elastomeric rings will contact the outwardly sloping circumferential edges on the ends of said metal ring so that when said pipe lengths are connected into said coupling, said elastomeric rings are forced upwardly over said outwardly sloping circumferential edges on the ends of said metal ring and along said annular surfaces of said metal ring and then over the sloping ends of said annular shoulder and said shoulder completely fill any void between said pipe lengths and coupling when they are connected together.

2. The invention of claim 1 wherein the other end of each of said elastomeric rings is substantially perpendicular to the longitudinal axis of said ring so that as said pipe lengths are connected into said coupling, said ends of said lined pipe lengths and said sleeve ends cooperate to force said elastomeric rings to fill any voids between said pipe lengths and coupling when they are connected together.

References Cited

UNITED STATES PATENTS

| | | | |
|---|---|---|---|
| 325,895 | 9/1885 | Agnew | 285—369 X |
| 2,340,852 | 2/1944 | Wormeley | 285—259 X |
| 3,253,841 | 5/1966 | Ahmad | 285—55 |
| 3,298,716 | 1/1967 | Taylor et al. | 285—55 |

FOREIGN PATENTS

| | | |
|---|---|---|
| 427,434 | 6/1911 | France. |
| 149,232 | 12/1952 | Australia. |
| 267,697 | | Great Britain. |

DAVID J. WILLIAMOWSKY, Primary Examiner

D. W. AROLA, Assistant Examiner

U.S. Cl. X.R.

285—258, 371, 355